(12) United States Patent
Sansalone et al.

(10) Patent No.: US 11,686,466 B2
(45) Date of Patent: Jun. 27, 2023

(54) ILLUMINATING STRUCTURES WITH FIBER OPTIC LIGHTING

(71) Applicant: Lit Decks, Inc., Chestemere (CA)

(72) Inventors: Ashley Sansalone, Calgary (CA); Talal Fouani, Calgary (CA)

( * ) Notice: Subject to any disclaimer, the term of this patent is extended or adjusted under 35 U.S.C. 154(b) by 0 days.

(21) Appl. No.: 15/734,618

(22) PCT Filed: Oct. 29, 2019

(86) PCT No.: PCT/IB2019/059276
§ 371 (c)(1),
(2) Date: Dec. 3, 2020

(87) PCT Pub. No.: WO2021/084301
PCT Pub. Date: May 6, 2021

(65) Prior Publication Data
US 2022/0252248 A1 Aug. 11, 2022

(51) Int. Cl.
*G02B 6/46* (2006.01)
*F21V 33/00* (2006.01)
*F21V 8/00* (2006.01)

(52) U.S. Cl.
CPC .......... *F21V 33/006* (2013.01); *G02B 6/0005* (2013.01); *G02B 6/46* (2013.01); *F21V 2200/10* (2015.01)

(58) Field of Classification Search
CPC . F21V 33/006; F21V 2200/10; G02B 6/0005; G02B 6/46; G02B 6/48
See application file for complete search history.

(56) References Cited

FOREIGN PATENT DOCUMENTS

GB 2159669 A * 12/1985 ............... H02G 9/06
* cited by examiner

*Primary Examiner* — Donald L Raleigh
(74) *Attorney, Agent, or Firm* — Lewellyn Law, PLLC; Stephen Lewellyn

(57) ABSTRACT

A method of fitting a structural member having a passage with fiber optical lighting, the method comprising: a) drilling a first hole through the structural member across the passage and through opposite first and second surfaces of the structural member; (b) enlarging the first hole at the second surface of the structural member forming a second hole; (c) inserting a cable puller having a cable hooking end through the passage to a point such that the cable hooking end is disposed inwardly from the first hole and second hole; (d) inserting a first end of a fiber optic cable first through the second hold and then through the corresponding first hole; (e) securing the first end of the fiber optic cable against being pulled back through the first hole; (f) withdrawing the cable feeder from the passage, hooking the fiber optic cable by the cable hooking end; (g) pulling a second end of the fiber optic cable from the passage; (h) injecting curable material into the passage through the second hole to encapsulate at least a length of the fiber optic cable within the curable material; and (i) cutting the first end of the fiber optic cable flush with the first surface.

13 Claims, 8 Drawing Sheets

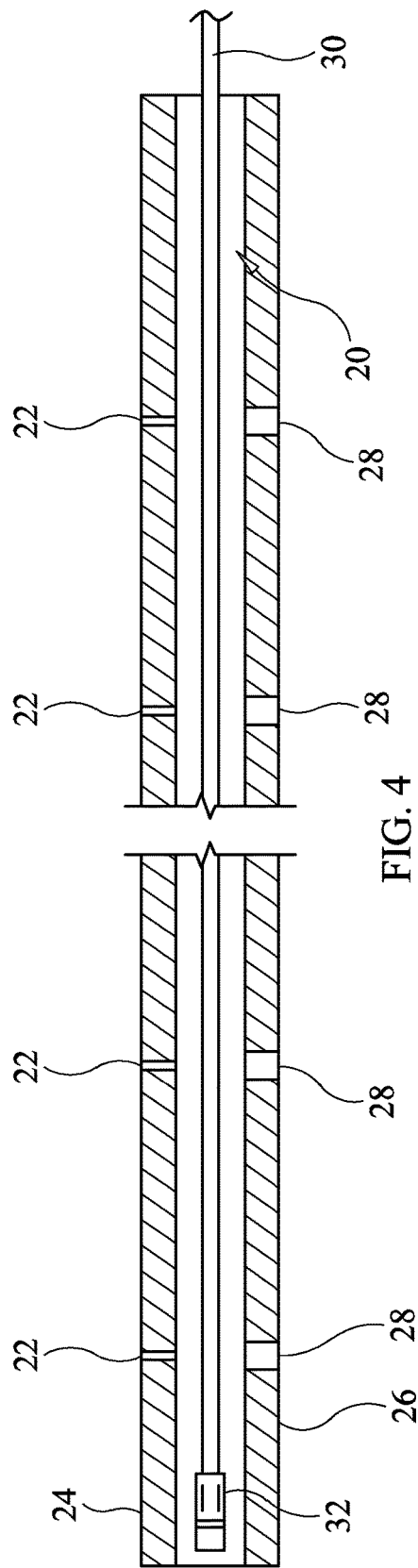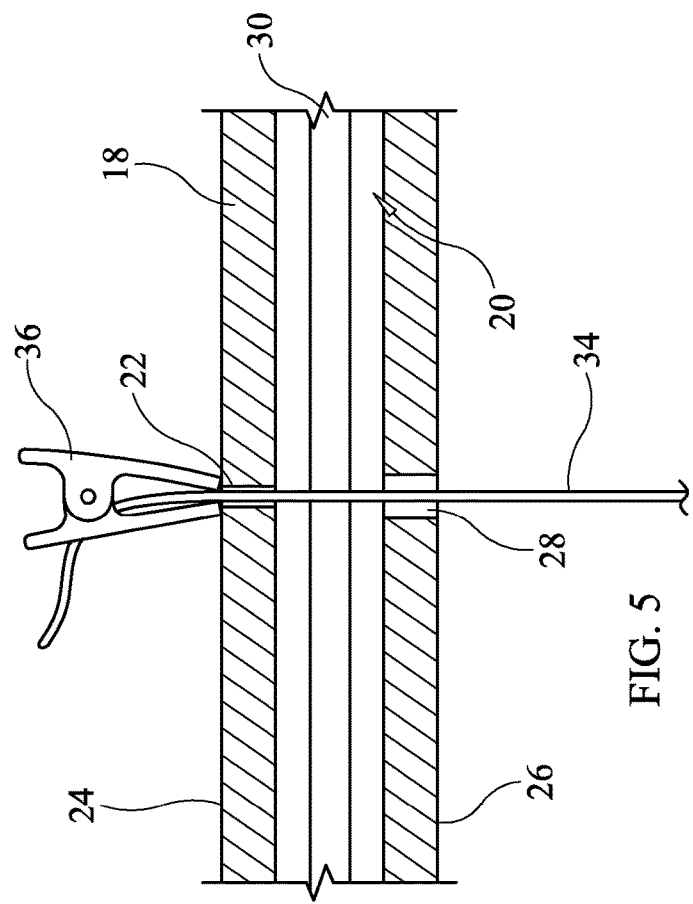

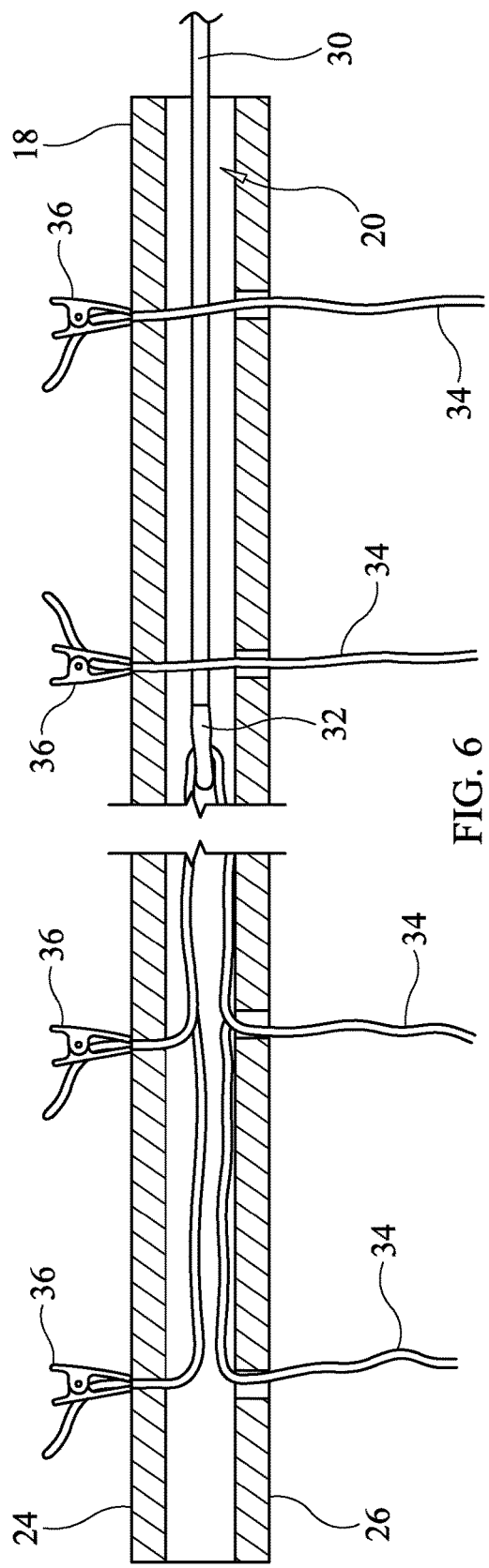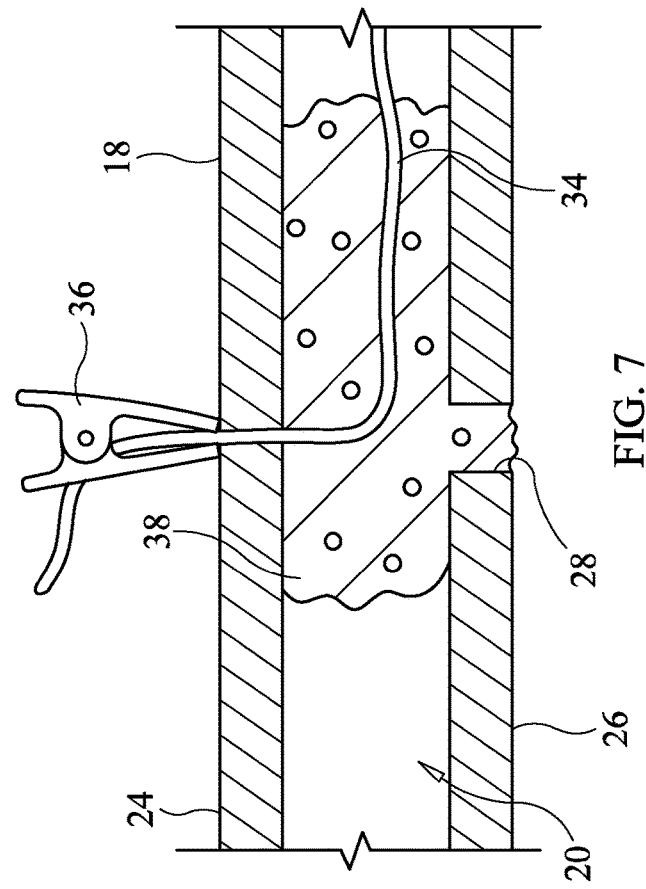

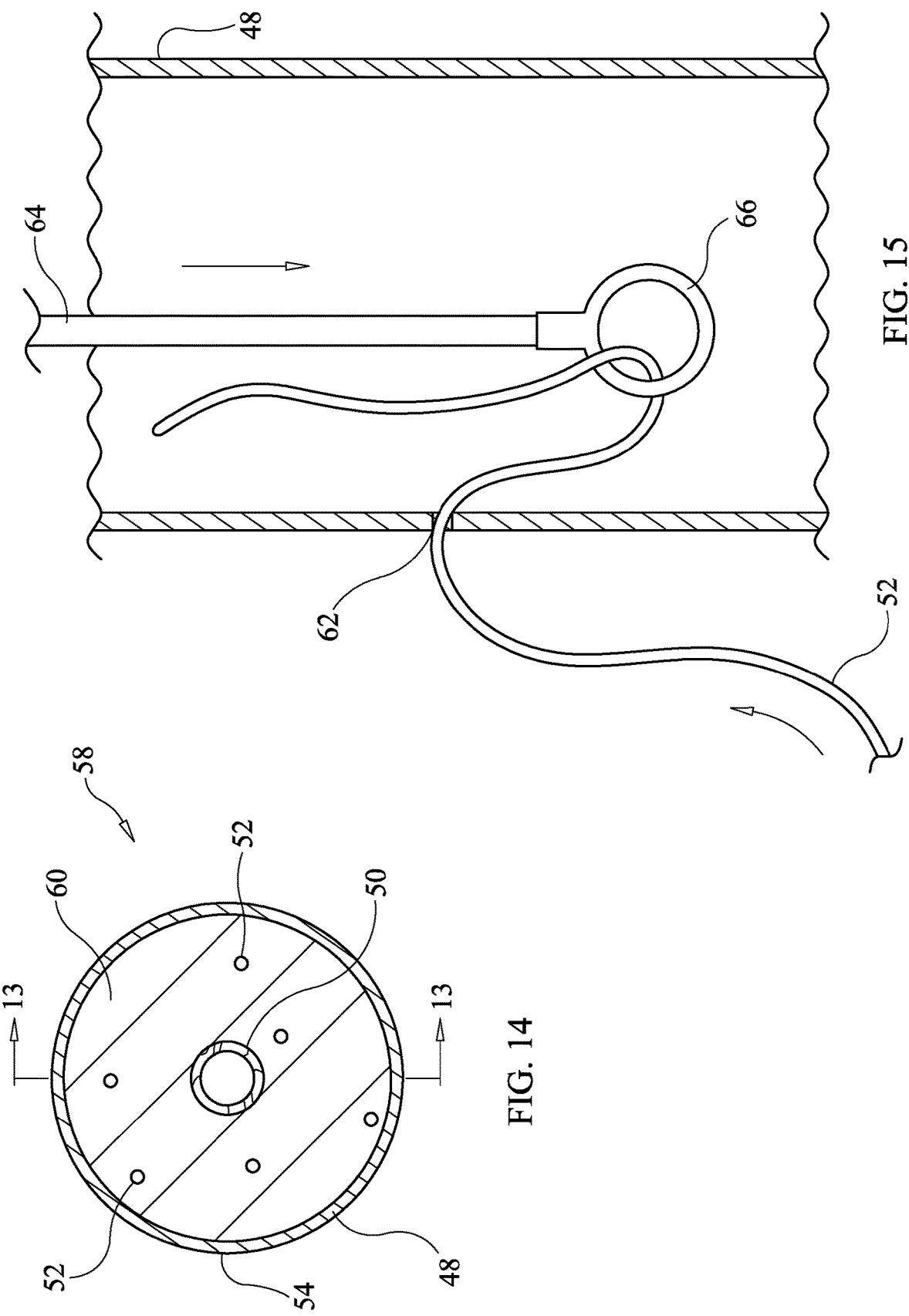

ILLUMINATING STRUCTURES WITH FIBER OPTIC LIGHTING

FIELD OF THE INVENTION

The present disclosure relates to methods of lighting structures with fiber optic cable.

BACKGROUND OF THE INVENTION

It is frequently desirable to provide decorative lighting to various structures such as, for example, decks, walkways, gardens, and various water features. While numerous systems exist to provide lighting to structures for either decorative or safety purposes, a need and desire remains for new methods of fitting structures with fiber optic lighting.

SUMMARY OF THE INVENTION

Embodiments of the invention provide methods of installing decorative fiber optic lighting to various structural member, such as, for example decking components and water features.

An object of embodiments of the present invention is to provide methods of installing decorative fiber optic lighting having a waterproof construction.

Another object of embodiments of the present invention is to provide methods that are easily followed to install decorative fiber optic lighting in various structures.

In general, in one aspect, a method of fitting a structural member having a passage with fiber optical lighting is provided. The method includes the following steps:
  (a) drilling a first hole through the structural member across the passage and through opposite first and second surfaces of the structural member;
  (b) enlarging the first hole at the second surface of the structural member forming a second hole;
  (c) inserting a cable feeder having a cable hooking end through the passage to a point such that the cable hooking end is disposed inwardly from the first hole and second hole;
  (d) inserting a first end of a fiber optic cable first through the second hold and then through the corresponding first hole;
  (e) securing the first end of the fiber optic cable against being pulled back through the first hole;
  (f) withdrawing the cable feeder from the passage, hooking the fiber optic cable by the cable hooking end;
  (g) pulling a second end of the fiber optic cable from the passage;
  (h) injecting curable material into the passage through the second hole to encapsulate at least a length of the fiber optic cable within the curable material; and
  (i) cutting the first end of the fiber optic cable flush with the first surface.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings:

FIG. 4 is a partial cross-sectional view through a deck board illustrating a step used in fitting of fiber optic cable to the deck board, showing a cable puller positioned to pull fiber optic cable;

FIG. 5 is a partial cross-sectional view through a deck board illustrating a step used in fitting of fiber optic cable to the deck board, an end of a fiber optic cable secured;

FIG. 6 is a partial cross-sectional view through a deck board illustrating a step used in fitting of fiber optic cable to the deck board, showing multiple fiber optic cable being pulled by a cable puller;

FIG. 7 is a partial cross-sectional view through a deck board illustrating a step used in fitting of fiber optic cable to the deck board, showing a fiber optic cable secured to a deck board with expanding foam material;

FIG. 14 is a cross-sectional view taken along line 14-14 in FIG. 12; and

FIG. 15 is a partial cross-sectional view through a conduit illustrating a step used in fitting of fiber optic cable to the conduit, showing fiber optic cable being pulled through the conduit by a cable pusher.

DETAILED DESCRIPTION OF THE INVENTION

Figure 1:
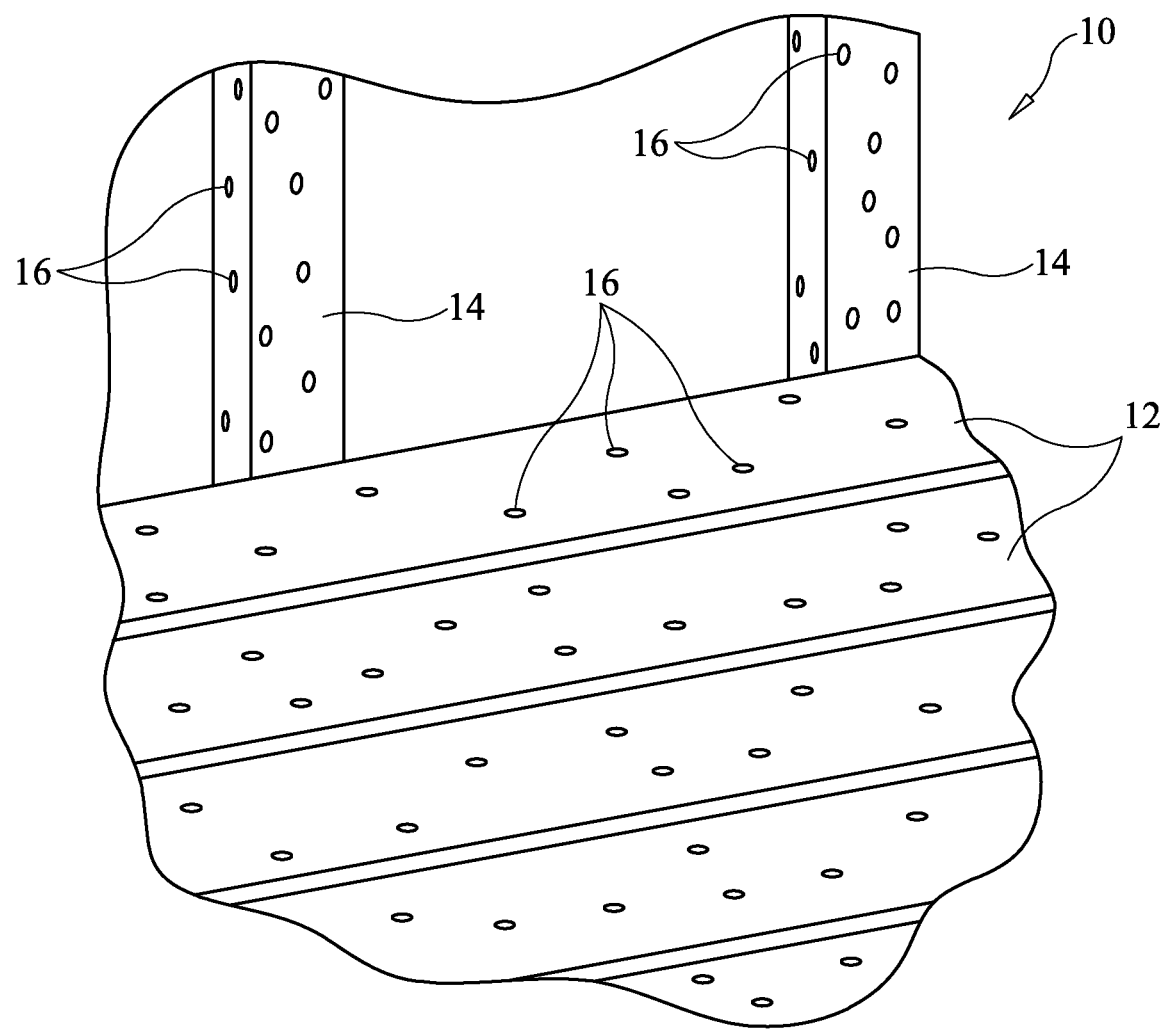
FIG. 1 is partial perspective view of a deck in accordance to an embodiment of the invention.

FIG. 1 depicts a partial view of a typical deck 10 having a deck surface comprised of a plurality of deck boards 12 and a plurality of deck posts 14. The deck boards 12 and the deck posts 14 are fitted with fiber optic lighting to provide decorative lighting to the deck at night. Particularly, as it can be seen the ends 16 of a plurality of fiber optic cables are exposed at the surfaces of the deck boards and deck posts.

While not shown here, the fiber optic cables are connected at their opposite ends to a light driver which operates to transmit light through the fiber optic cables, which is then visible at ends 16 disposed at the surface of the boards and posts. It is important to note at the outset that the light driver and the fiber optic cables themselves do not form part of the inventive concept disclosed herein. Fiber optical lighting systems including fiber optic cables and associated light drivers are well known in the art, and the specific structure of these systems do not form part of the invention. Rather, persons of ordinary skill in the art are well versed in these fiber optic lighting systems and can select such systems for use in the inventive concepts described in this disclosure.

Figure 2:
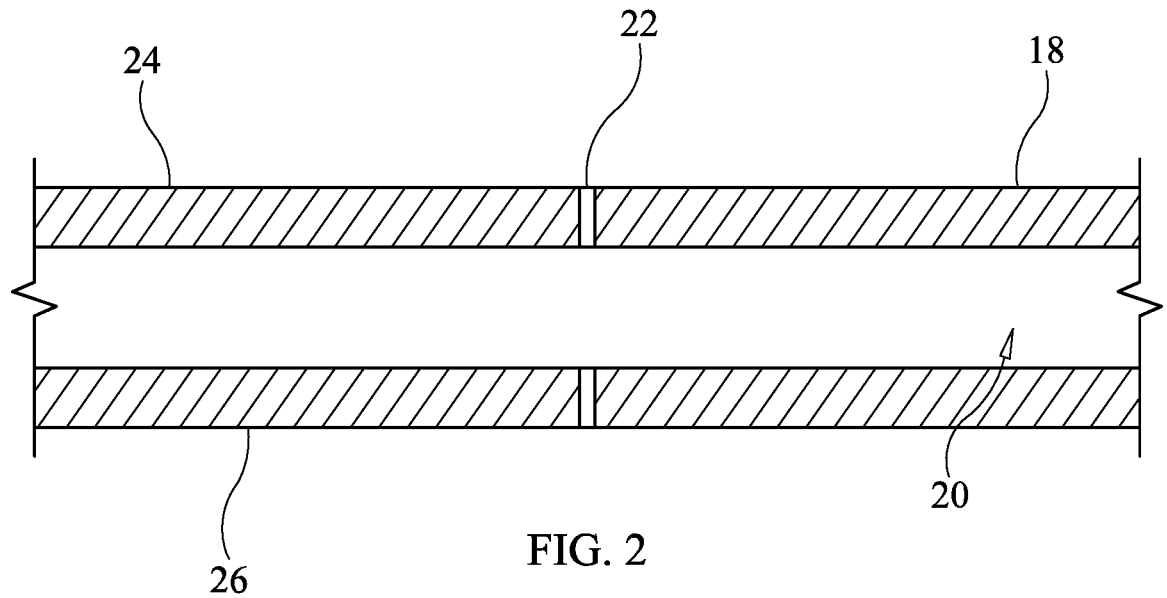
FIG. 2 is a partial cross-sectional view through a deck board illustrating a step used in fitting of fiber optic cable to the deck board, showing holes drilled through the decking.

With reference to FIGS. 2-9, a method of fitting a structure, representatively a deck board with fiber optic cabling for the purpose of providing decorative lighting at the surface of the deck board is explained. In FIG. 2, there is shown a partial, longitudinal cross-section of a deck board 18 such as, a deck board constructed of composite material, for example, and having one or more passages 20 formed along the length of the board. A first step includes drilling a first hole 22 through the thickness of board 18 and the upper and lower surfaces 24 and 26, respectively. The hole diameter is selected to be slightly larger than the diameter of a fiber optic cable.

Figure 3:
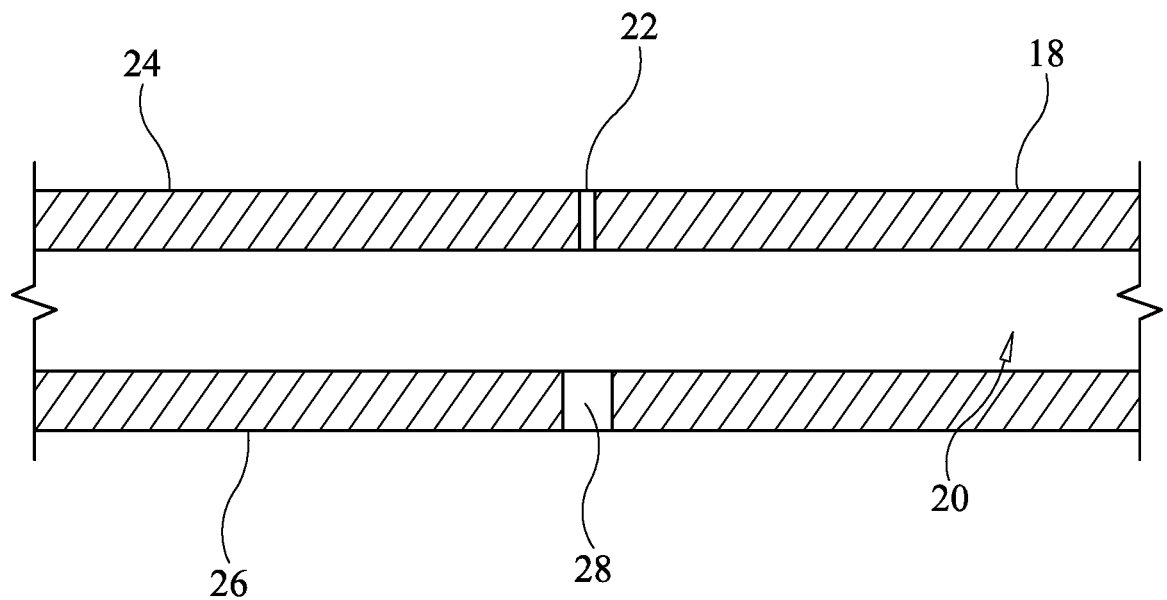
FIG. 3 is a partial cross-sectional view through a deck board illustrating a step used in fitting of fiber optic cable to the deck board, showing one of the holes enlarged.

In FIG. 3, a second step includes widening the first hole 22 made through the board 18 at the lower surface 26 to form a second hole 28 that is wider than the first hole. These first two steps are repeated as many times as necessary to create a desired number and pattern of holes through the board 18 to create a desired light pattern.

In FIG. 4, once a desired number of hole pairs have been formed in the board 18, in a third step, a pole 30 having a hook 32 at its distal end is inserted through passage 20 through one end of the board to the other end of the board.

In FIG. 5, following insertion of the hook-end pole 30, individual fiber optic cables, representatively cable 34, are inserted through each hole pair first through hole 28 made at the under surface 26 and then through hole 22 made at the top surface 24. Once inserted, the fiber optic cable 34 is secured by a clip 36, for example, to prevent the cable from withdrawing from the hole 22.

In FIG. 6, following the positioning of a fiber optic cable 34 through each hole pair and securing the cable in place, in a sixth step, pole 30 is pulled back through passage 20 and out of the end of the board it was inserted. In doing so, the hook 32 captures each fiber optic cable 34 and pulls them through the passage 20 and out of the board end (not shown here). Afterwards, the cables 34 are further pulled to pull their free ends through holes 28 and then out the end of the board.

Figure 8:
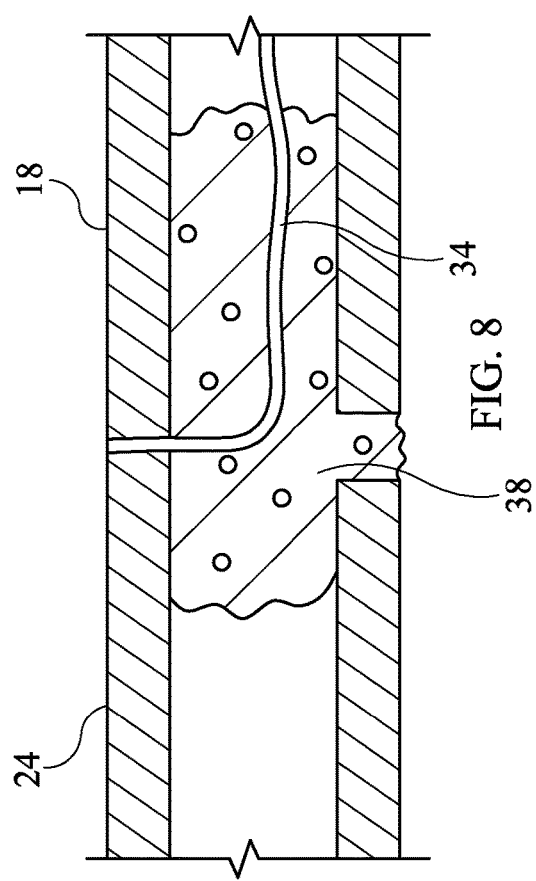
FIG. 8 is a partial cross-sectional view through a deck board illustrating a step used in fitting of fiber optic cable to the deck board, showing a fiber optic cable cut flush with a top surface of a deck board.
Figure 9:
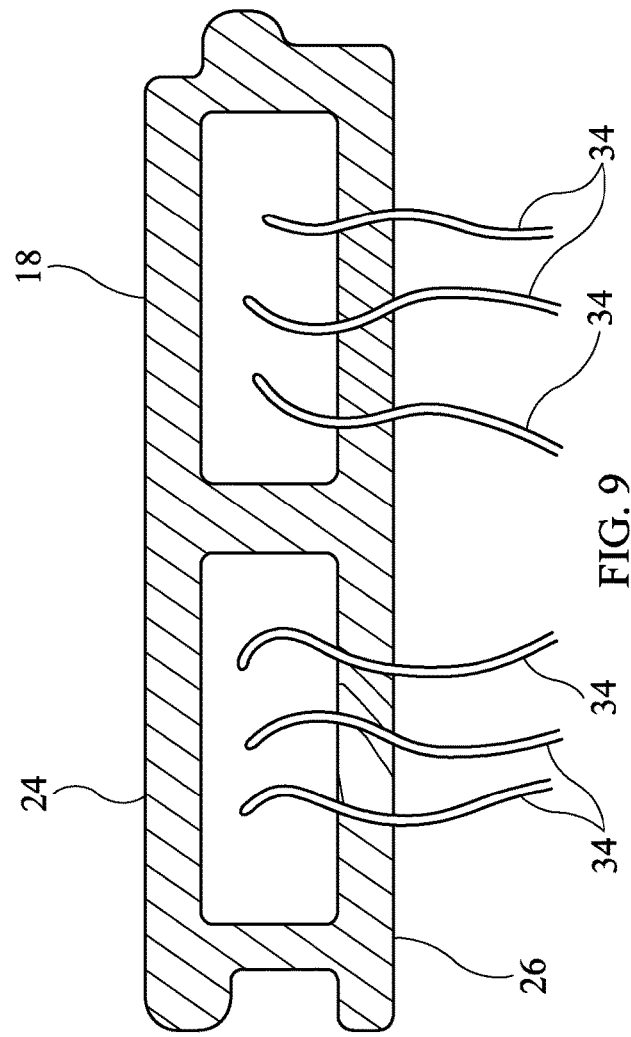
FIG. 9 is an end view of a deck board, showing multiple fiber optic cables.

In FIG. 7, after the free ends of the fiber optic cables 34 are pulled through the end of the board 18, in a seventh step, each cable is secured in place by expanding foam 38 that is injected into the passage 20 at each cable location through hole 28. Once the foam 38 has cured, in an eight step, each fiber optic cable 34 is cut with a heated blade, for example, to be flush with the top surface 24 of the board 18, as seen in FIG. 8. FIG. 9 is an end view of board 18, showing a plurality of fiber optic cables 34 strung through the end of the board after being secured by the foam.

Figure 10:
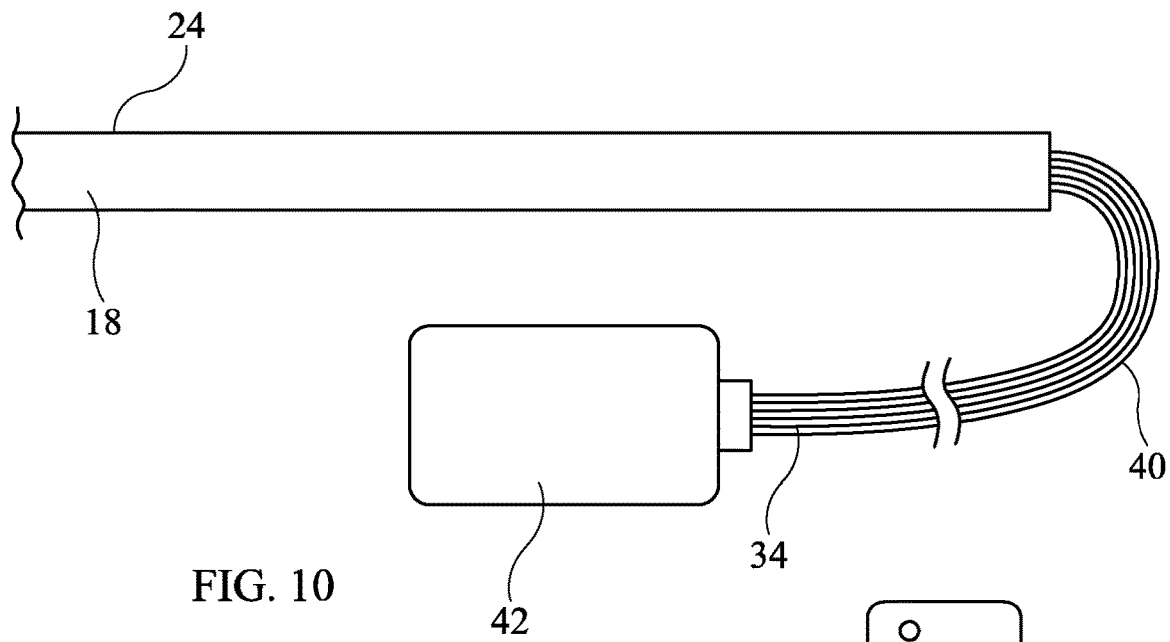
FIG. 10 is a diagrammatic view of a deck board having multiple fiber optic cables fitted to the board and those cables forming a cable bundle that is connected to a light driver.

In FIG. 10 there is depicted a deck board 18 and a bundle 40 of individual fiber optic cables 34 that have been fitted to the board. The bundle 40 is connected to a light driver 42 that is operable to illuminate the opposite ends of the fiber optic cables disposed at the surface 24 of the board.

Figure 11:
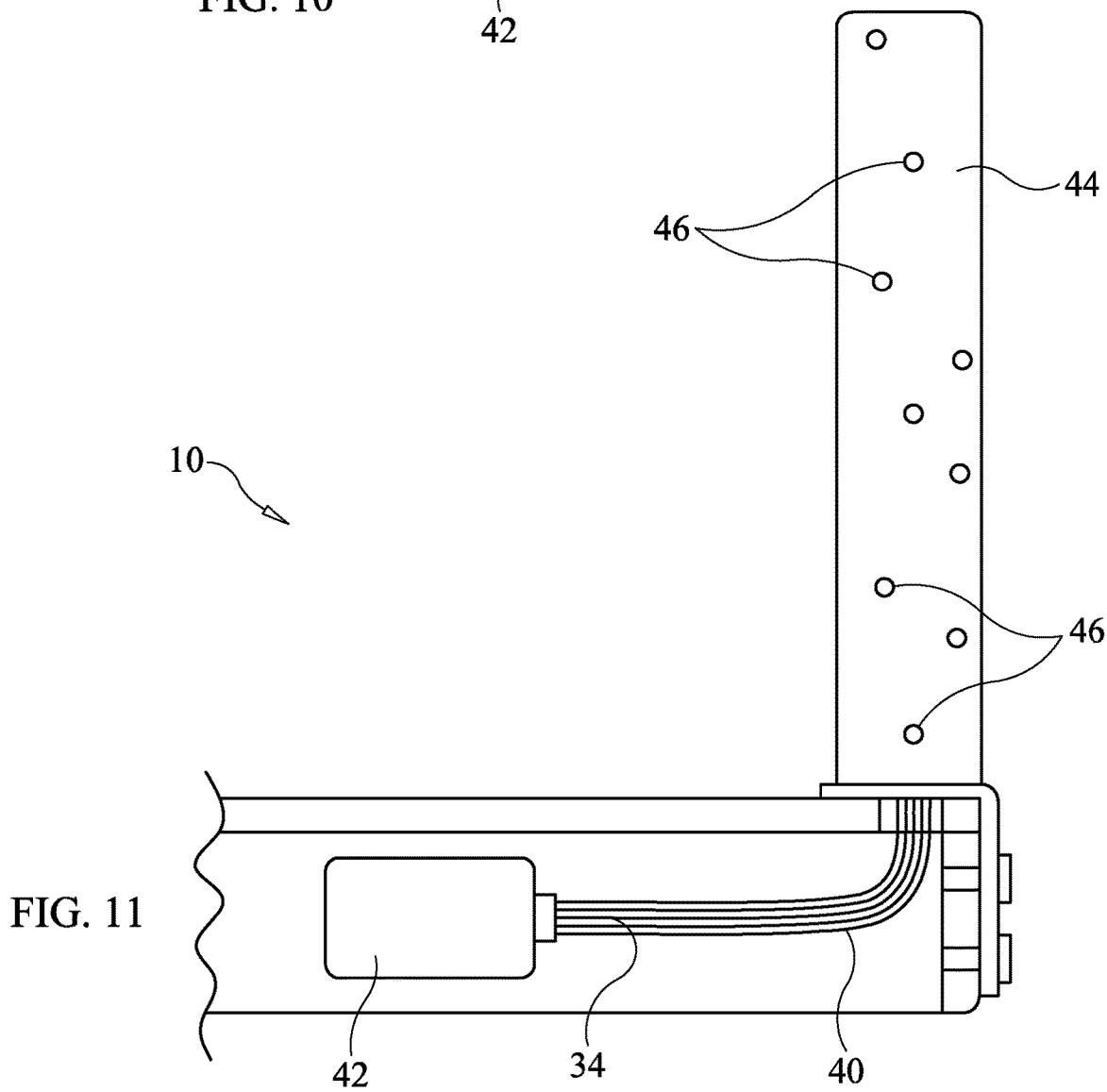
FIG. 11 is a side view of a deck post having fiber optic cables fitted thereto.

In FIG. 11 there is depicted a deck post 44 that has been fitted with fiber optic cables for decorative lighting. As seen the cables extend through the bottom end of the post 44 and the opposite end 46 of each cable is exposed at the surface of the post side. The fiber optic cables can be installed on deck post 44 by the method described above, or by the method that is described herein below. Further, as shown, the fiber optic cable bundle 40 is connected to light driver 42.

Figure 13:
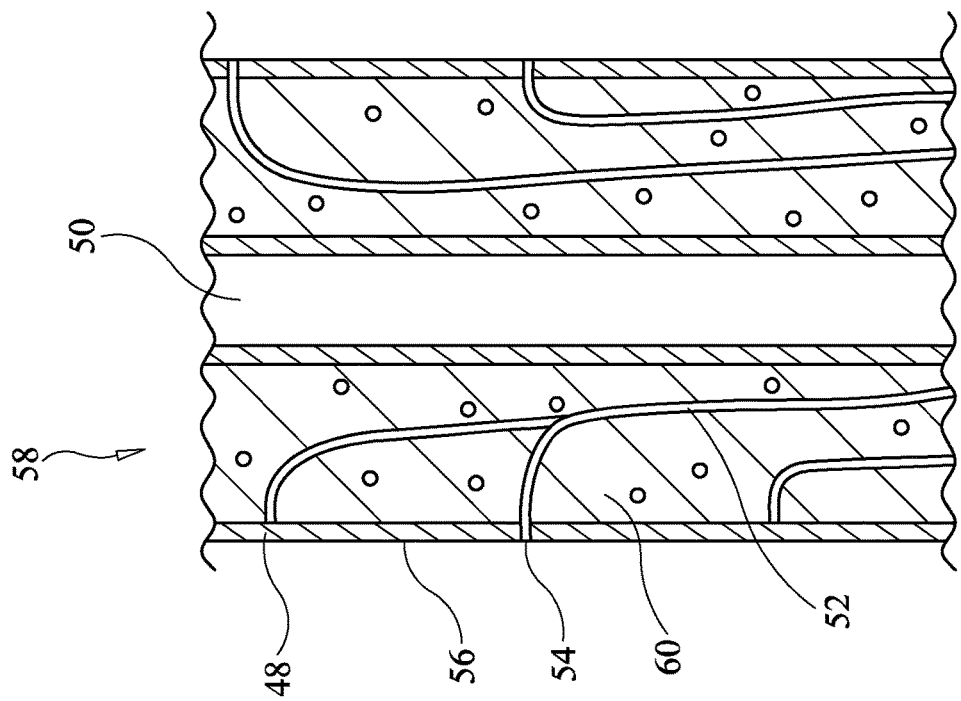
FIG. 13 is a cross-sectional view taken along line 13-13 in FIG. 14.
Figure 12:
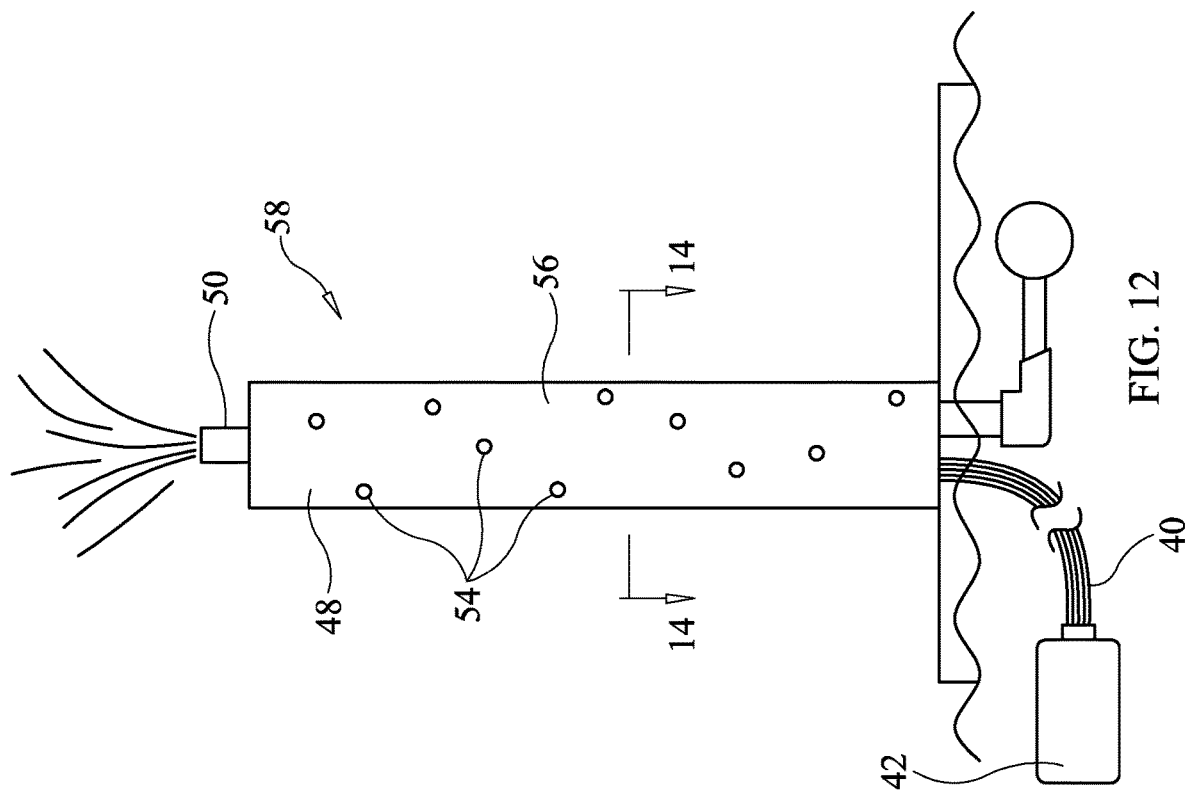
FIG. 12 is a side view of a water feature structure according to an embodiment of the invention.

In FIGS. 12-14 there is depicted an example of another structure, representatively, a structure 58 for use in a water feature having a fiber optic lighting in accordance with this disclosure. Particularly, as shown the structure includes an outer pipe or conduit 48, an inner pipe or conduit 50, and a plurality of fiber optic cables 52. The ends 54 of the fiber optic cables 52 are made flush with the exterior surface 56 of the outer conduit 48. The inner conduit 50 and the fiber optic cables 52 are secured by a setting material 60 that is poured into the annulus formed between the outer and inner conduits 48 and 50, which is allowed to cure and harden, thereby securing the inner conduit and the cables with the outer conduit. The setting material can be of any number of materials such as, for example, expanding foam, concrete, foamed concrete, and the like. Structure 58 can be constructed in a similar manner described above in reference to the deck board.

Structure 58 and other similar structures such as, for example, deck post 44 can be constructed in the following modified method. In FIG. 15 there is depicted a partial cross-section of an outer conduit 48. As shown, a hole 62 is drilled through the side of the conduit 48, and an end of a fiber optic cable 52 is inserted into the conduit through the hole. A pole 64 having an eyelet 66 attached at its end has the end 68 of the fiber optic cable 52 threaded therethrough. The length of the cable 52 is pulled through the conduit 48 by pushing the pole toward the end of the conduit and while feeding the cable through the hole 62. This is repeated for each cable 52 that is fitted to the conduit 48. Once all of the cables 52 have been pulled through the conduit 48, similar to how the cables are pulled through the deck board, the inner conduit 50 is positioned in the outer conduit, and the setting material 60 is poured into the annulus between the inner and outer conduits. Once the setting material 60 cures to a hardened state, the ends of the cables 52 are cut flush with the exterior surface 56 of the outer conduit 48. The structure 58 can then be used in building a water feature, with the inner conduit connectable to a source of water as desired and the cables 52 connected to a light driver.

Further, as depicted in FIG. 12, the water feature 58 is shown connected to a water pump 70 for pumping water 72 through conduit 50. Additionally, fiber optic cable bundle 40 is connected to light driver 42.

Several embodiments of the present invention have been described. Nevertheless, it will be understood that various modifications may be made without departing from the spirit and scope of the invention. Accordingly, other embodiments are within the scope of the following claims.

What is claimed is:

1. A method of fitting a structural member having a passage with fiber optical lighting, the method comprising:
   (a) drilling a first hole through the structural member across the passage and through opposite first and second surfaces of the structural member;
   (b) enlarging the first hole at the second surface of the structural member forming a second hole;
   (c) inserting a cable puller having a cable hooking end through the passage to a point such that the cable hooking end is disposed inwardly from the first hole and second hole;
   (d) inserting a first end of a fiber optic cable first through the second hole and then through the corresponding first hole;
   (e) securing the first end of the fiber optic cable against being pulled back through the first hole;
   (f) withdrawing the cable feeder from the passage, hooking the fiber optic cable by the cable hooking end;
   (g) pulling a second end of the fiber optic cable from the passage;
   (h) injecting curable material into the passage through the second hole to encapsulate at least a length of the fiber optic cable within the curable material; and
   (i) cutting the first end of the fiber optic cable flush with the first surface.

2. The method of claim 1, wherein the structural member is a decking board.

3. The method of claim 1, wherein steps (a) and (b) are repeated for each fiber optic cable that is to be fitted to the structure before proceeding with any of the remaining steps.

4. The method of claim 1, wherein the curable material is an expanding foam.

5. The method of claim 1, wherein steps (a) and (b) are repeated for each fiber optic cable that is to be fitted to the structure before proceeding with step (c), and steps (d) and (e) are repeated for each fiber optic cable before proceeding with the remaining steps.

6. The method of claim 5, wherein the curable material is an expanding foam.

7. The method of claim 5, wherein the structural member is a deck board.

8. A method of fitting a structural member having a passage with fiber optical lighting, the method comprising:
   (a) drilling a first hole through a side surface of the structural member from an exterior surface thereof into the passage;
   (b) inserting a first end of a fiber optic cable through said first hole;
   (c) pulling the first end of the fiber optic cable through said passage and out of an end thereof;
   (d) securing the fiber optic cable in the passage by a curable or settable material; and
   (e) cutting a second end of the fiber optic cable flush with the exterior surface.

9. The method of claim 8, wherein the structural member is a post.

10. The method of claim 8, further comprising:
    placing an inner conduit through the passage before step (d) and wherein the curable or settable material also secures the conduit in the passage.

11. The method of claim 10, wherein the structural member is a conduit and provides an outer conduit.

12. The method of claim 8, wherein the steps (a), (b), and (c) are repeated for each fiber optic cable that is to be fitted to the structure before proceeding with step (d).

13. The method of claim 12, wherein step (e) is performed for each fiber optic cable.

\* \* \* \* \*